United States Patent
Hodgson et al.

(10) Patent No.: US 8,453,430 B2
(45) Date of Patent: Jun. 4, 2013

(54) CONFIGURATION AND METHOD FOR CLEANING AN EXHAUST GAS FLOW OF AN INTERNAL COMBUSTION ENGINE BY SEPARATING PARTICLES AND MOTOR VEHICLE HAVING THE CONFIGURATION

(75) Inventors: Jan Hodgson, Troisdorf (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 203 days.

(21) Appl. No.: 13/111,094

(22) Filed: May 19, 2011

(65) Prior Publication Data

US 2011/0214413 A1    Sep. 8, 2011

Related U.S. Application Data

(63) Continuation of application No. PCT/EP2009/064656, filed on Nov. 5, 2009.

(30) Foreign Application Priority Data

Nov. 19, 2008 (DE) .......................... 10 2008 057 960

(51) Int. Cl.
*F01N 3/00* (2006.01)
(52) U.S. Cl.
USPC ................... 60/275; 60/274; 60/286; 60/287; 60/295; 60/311; 422/186.04; 422/186.07; 422/186.1

(58) Field of Classification Search
USPC .................. 60/274, 275, 278, 286, 287, 288, 60/295, 297, 303, 311; 422/186.03, 186.04, 422/186.07, 186.1
See application file for complete search history.

(56) References Cited

U.S. PATENT DOCUMENTS 4,649,703 A    3/1987 Dettling et al.
(Continued)

FOREIGN PATENT DOCUMENTS

DE          3424196 A1    8/1985
DE    102007025416 B3   10/2008
(Continued)

OTHER PUBLICATIONS

International Search Report of PCT/EP2009/064656, Dated Mar. 3, 2010.

*Primary Examiner* — Binh Q Tran
(74) *Attorney, Agent, or Firm* — Laurence A. Greenberg; Werner H. Stemer; Ralph E. Locher

(57) ABSTRACT

A configuration for purifying or cleaning an exhaust-gas flow of an internal combustion engine includes at least an ionization device, an agglomeration device, and a (catalytically active) radial honeycomb body around a duct. The exhaust-gas is diverted from the duct into the radial honeycomb body, while the agglomerated particles are caught in a particle separator of the duct. A method for purifying or cleaning an exhaust-gas flow of an internal combustion engine and a motor vehicle including an exhaust system having the configuration, are also provided.

12 Claims, 4 Drawing Sheets

U.S. PATENT DOCUMENTS

| | | | |
|---|---|---|---|
| 4,945,721 A * | 8/1990 | Cornwell et al. | 60/274 |
| 5,402,639 A * | 4/1995 | Fleck | 60/275 |
| 5,950,424 A * | 9/1999 | Nojima | 60/275 |
| 7,074,370 B2 * | 7/2006 | Segal et al. | 422/186.04 |
| 7,398,643 B2 | 7/2008 | Cotton | |
| 7,954,313 B2 * | 6/2011 | Hirata et al. | 60/286 |
| 2007/0000236 A1 | 1/2007 | Naito et al. | |
| 2007/0266702 A1 | 11/2007 | Cotton | |
| 2010/0294129 A1 | 11/2010 | Op De Laak et al. | |

FOREIGN PATENT DOCUMENTS

| | | |
|---|---|---|
| EP | 1 669 562 A1 | 6/2006 |
| GB | 2 419 544 A | 5/2006 |
| JP | 57148017 A | 9/1982 |
| JP | 2007315372 A | 12/2007 |
| WO | 0181735 A1 | 11/2001 |
| WO | 2007/131362 A1 | 11/2007 |

* cited by examiner

CONFIGURATION AND METHOD FOR CLEANING AN EXHAUST GAS FLOW OF AN INTERNAL COMBUSTION ENGINE BY SEPARATING PARTICLES AND MOTOR VEHICLE HAVING THE CONFIGURATION

CROSS-REFERENCE TO RELATED APPLICATION

This is a continuation, under 35 U.S.C. §120, of copending International Application No. PCT/EP2009/064656, filed Nov. 5, 2009, which designated the United States; this application also claims the priority, under 35 U.S.C. §119, of German Patent Application DE 10 2008 057 960.2, filed Nov. 19, 2008; the prior applications are herewith incorporated by reference in their entirety.

BACKGROUND OF THE INVENTION

Field of the Invention

The present invention relates to a configuration for the purification of an exhaust-gas flow of an internal combustion engine, in particular of a diesel engine, wherein particles from the exhaust-gas flow are electrically charged, agglomerated and separated out of the exhaust-gas flow. The invention also relates to a method for operating such a configuration and a motor vehicle having the configuration.

As a consequence of intensified emissions limit values, it has been necessary for some time for particles contained in the exhaust gas of internal combustion engines to be removed from the exhaust-gas flow and retained and/or if appropriate converted in the exhaust line. Furthermore, limit values with regard to particle masses (soot) to be discharged to the atmosphere, in particular by diesel engines, have been intensified as a result of legal regulations.

A multiplicity of different filter systems which have already been described for that purpose are based, for example, on so-called deep bed filters, wall-flow filters, partial-flow filters, cyclone separators and similar concepts. The treatment of the particles with electric fields, plasma and the like has also already been proposed in order to allow for the legal regulations. There are constantly new challenges for removing the differently constructed and/or composed particles from the exhaust gas as reliably and as completely as possible, specifically with regard to new fuels and/or combustion processes.

With regard to the installation of exhaust-gas purification systems in passenger motor vehicles as well as in utility vehicles, as small a structural size as possible is, in particular, in the foreground of development. Therefore, there is a demand, in particular, for compact systems which permit installation in current and future vehicle generations.

SUMMARY OF THE INVENTION

It is accordingly an object of the invention to provide a configuration and a method for cleaning an exhaust gas flow of an internal combustion engine by separating particles and a motor vehicle having the configuration, which overcome the hereinafore-mentioned disadvantages and at least partially solve the highlighted problems of the heretofore-known configurations, methods and vehicles of this general type and which, in particular, specify a configuration for the purification of an exhaust-gas flow of an internal combustion engine which can firstly reduce the number of particles in the exhaust-gas flow and can secondly considerably reduce the particle mass in the exhaust-gas flow. In this case, it is sought to realize as compact a structure as possible, and it should also be possible for facilities for the recovery of exhaust-gas heat to be integrated into the configuration.

With the foregoing and other objects in view there is provided, in accordance with the invention, a configuration for purifying an exhaust-gas flow of an internal combustion engine, in particular of a diesel engine. The configuration comprises:

a) an ionization device for electrically charging particles in the exhaust-gas flow;
b) an agglomeration device for at least partially agglomerating the electrically charged particles;
c) a duct including at least a peripheral surface through which fluid can flow, a first end side with an inlet and a second end side with an outlet;
d) a radial honeycomb body having an inner peripheral surface, an outer peripheral surface and flow channels extending from the inner peripheral surface to the outer peripheral surface, the inner peripheral surface being disposed on the peripheral surface of the duct; and
e) a particle separator configured for at least temporarily retaining the particles from the exhaust-gas flow.

The ionization device and the agglomeration device are disposed upstream of the inlet or in the duct and the particle separator is disposed downstream of the outlet or in the duct.

The ionization device is suitable for electrically charging particles in the exhaust-gas flow. The particles are agglomerated to form larger particles in the agglomeration device which follows downstream of the ionization device. In this case, the ionization device may be constructed in different ways, and in particular may relate to a free cross section of an exhaust line and/or to a structure disposed therein. An ionization apparatus of this type transmits an electrical charge to carbon-containing particles contained in the exhaust-gas flow by forming a potential difference (for example more than 5,000 V or even more than 30,000 V).

The ionization device is accordingly formed, in particular, by an electrode which is disposed within the exhaust-gas flow. In this case, the electrode is formed, in particular, as a structure or honeycomb body. The electrical potential is then formed between the ionization device and the agglomeration device which is disposed downstream, in such a way that the particles are electrically charged in the ionization device and are at least temporarily deposited on the walls of the agglomeration device and agglomerate there, or already in the exhaust-gas flow, to form larger particles.

Furthermore, the ionization device may transmit the charge to the particles by forming a corona discharge or plasma discharge.

The configuration also includes a duct which is formed at least partially by the inner peripheral surface of a radial honeycomb body. Accordingly, the duct is formed, at its peripheral surface, so as to be at least partially open in such a way that the exhaust-gas flow enters directly from the duct into the honeycomb structure of the radial honeycomb body. The peripheral surface of the duct may also be formed by a sleeve which is provided at least partially with openings through which the exhaust-gas flow can emerge out of the duct. The duct also has an inlet at a first end side and an outlet at a second end side, wherein the inlet and outlet may, in particular, also have different areas. In particular, the outlet of the duct is constructed to be smaller than the inlet.

The configuration also provides a radial honeycomb body which at least partially surrounds the peripheral surface of the duct and through which flows at least a major part of the exhaust-gas flow passing through the duct. In this case, the flow channels of the radial honeycomb body extend from the inner peripheral surface to the outer peripheral surface in the radial direction with respect to the duct (the exhaust line), wherein the flow channels may at least partially also have a profile shape curved in the peripheral direction. The flow channels of the radial honeycomb body may furthermore have structures and/or fixtures which can effect a thorough mixture of and/or turbulence formation in the exhaust-gas flow. The radial honeycomb body is preferably formed from at least partially structured metal foils, and also has, in particular, fibrous layers.

The configuration also has a particle separator which at least temporarily retains the particles from the exhaust-gas flow, wherein the particle separator is disposed downstream of the outlet or in the (central) duct (outside the radial honeycomb body), in such a way that at least a major part of the exhaust-gas flow flows through the radial honeycomb body without flowing through the particle separator. If the particle separator is disposed in the duct, then the duct is, in particular, constructed to be longer than the radial honeycomb body, in such a way that the particle separator preferably does not overlap the inner peripheral surface, which is disposed downstream, of the radial honeycomb body, but rather is disposed only downstream thereof in terms of flow, outside the extent of the radial honeycomb body in the longitudinal direction (for example in the manner of a dead end street). It is, however, also possible, in particular, for the particle separator to be disposed in that region of the duct which lies within the inner peripheral surface of the radial honeycomb body, that is to say within the extent thereof in the longitudinal direction. In the case of such a construction, the particle separator itself is, in particular, provided with openings in the direction of the inner peripheral surface of the radial honeycomb body, and/or has an outer diameter which is reduced in relation to the duct, in such a way that the exhaust-gas flow can enter into the flow channels of the radial honeycomb body over the entire inner peripheral surface of the radial honeycomb body.

The particle separator has, in particular, a greater flow resistance than the radial honeycomb body, in such a way that only a relatively small part of the exhaust-gas flow acts on or flows through the particle separator. In special cases, the particle separator may also be constructed to be practically impenetrable to the exhaust gas, for example in the manner of a baffle plate with a particle removing device (heater), and/or as a porous mat or structure through which fluid can flow (with difficulty).

As a result of the configuration of the particle separator in the duct or downstream of the outlet, the exhaust-gas flow is deflected at least partially out of the duct and into the radial honeycomb body, wherein the agglomerated particles from the exhaust-gas flow, due to the increased particle mass, have such an inertia that they at least partially cannot follow the deflection of the exhaust-gas flow, but rather pass through the duct into the particle separator. In this regard, it is in particular not necessary for the exhaust-gas flow to flow through the particle separator. In fact, the particle separator may also be constructed as a flow dead end in the form of a wall or a structure. The particles are thus transferred out of the exhaust-gas flow into a region of the exhaust line through which fluid substantially cannot flow, in such a way that the particles are not discharged through the radial honeycomb body into the exhaust line situated downstream. The particles thus at least temporarily remain in the particle separator or in that zone of the exhaust line through which fluid substantially does not flow and which is provided for the deposition of the agglomerated particles out of the exhaust-gas flow.

In one embodiment of the particle separator through which fluid can flow, a relatively small part of the exhaust-gas flow is conducted through the particle separator and conducted through a further section of the exhaust line. The particles are then at least partially filtered out of the exhaust-gas flow and are at least temporarily retained in the particle separator.

The described configuration is suitable, in particular in the case of diesel engines, for electrically charging the particles contained in the exhaust gas in the ionization device and agglomeration device and at least temporarily joining the particles together in the agglomeration device. There, the particles are merged for example on structures of the agglomeration device which may be provided, in such a way that the particles agglomerate and thereby increase their average diameter and their mass. As a result of the pulsed exhaust-gas flow or, in particular, through the use of an external excitation of the agglomeration device, the particles are detached from the latter and released back into the exhaust-gas flow.

As a result of the agglomeration of the particles, the particles now have such a high mass and therefore such a high inertia that they cannot follow the deflection of the exhaust-gas flow within the duct into the radial honeycomb body, but rather substantially fly further in the direction of extent of the duct and are transferred into the particle separator. A deflection of the particles out of the exhaust-gas flow, in particular, through the use of an electric field configuration, which firstly is very complex in terms of construction and secondly has an extremely high energy requirement, is therefore no longer necessary.

In accordance with another feature of the invention, it is also preferable for the ionization device to have an apparatus for generating a corona discharge or plasma discharge. In automotive engineering, plasmas are generated preferably through the use of an electric field generated by using a high voltage. The generation of a plasma with a corona discharge or a dielectric barrier discharge is particularly preferable. If a corona discharge is desired, a non-uniform alignment of the electric field is possible. For example, apparatuses are known which have a wire that is surrounded by a very strong electric field which, however, decreases considerably in the radially outward direction and does not reach the housing surrounding the wire, as a result of which the formation of an arc is prevented. Alternatively, the formation of arcs may be avoided by applying a pulsed voltage. In the case of a dielectric barrier discharge, at least one electrode is coated with a dielectric. The arcs which are generated extinguish or expire beneath the surface of the dielectric material.

In accordance with a further feature of the configuration of the invention, the ionization device and/or the agglomeration device include(s) at least one element from the group including a pipe, a structure and a honeycomb body. This means that the ionization device and/or agglomeration device is disposed within the exhaust line and the electrical charge is transmitted to the particles in the ionization device either through the pipe through which fluid flows, that is to say a section of the exhaust line, or by a structure which is provided in the exhaust line and which is acted on with an electrical potential in relation to the agglomeration device. In this case, the structure extends at least over a major part of a cross section of the exhaust line, in such a way that the particles are provided with an electrical charge regardless of their position in the exhaust-gas flow. The structure may, in particular, be of stellate construction or else constructed in the form of a honeycomb body, in particular, with a cell density of 10 to 200 cpsi (cells per square inch), preferably 25 to 100 cpsi. The elements are additionally also used in the agglomeration device, and in this case have, in particular, a greater length in the throughflow direction. The honeycomb body provided for the devices has, in particular, non-structured smooth flow walls, that is to say no additional flow resistances or turbulence-generating or mixing elements, and is itself constructed from at least partially structured, in particular corrugated and smooth metal foils. An agglomeration device constructed as a honeycomb body firstly increases the surface area for the deposition and agglomeration of the particles contained in the exhaust gas, and secondly "calms" the exhaust-gas flow, in such a way that, in particular, a laminar exhaust-gas flow is present downstream of the agglomeration device. Such a laminarization of the exhaust-gas flow promotes the deposition of the agglomerated particles out of the exhaust gas in the particle separator, and/or prevents the particles flowing out through the radial honeycomb body as a result of turbulence in the exhaust gas. The element from the group including a pipe, a structure and a honeycomb body is, in particular, formed so as to be electrically insulated with respect to the exhaust line, thereby permitting a spatially delimited generation of potential between the ionization and agglomeration devices.

As a result of the electrical potential between the ionization device and the agglomeration device, the particles are at least partially deposited on the pipe wall or the surfaces of the structure or of the honeycomb body of the agglomeration device, in such a way that the particles agglomerate there at the latest, but also already in the exhaust-gas flow, to form greater diameters and greater masses.

In accordance with an added feature of the configuration of the invention, the radial honeycomb body at least partially has at least one coating from the group including an SCR coating, a 3-way coating and an $NO_x$ adsorber coating. An SCR coating refers to a coating which is suitable for converting nitrogen oxides through the use of the "selective catalytic reaction" method. The SCR coating has the effect, in particular, that nitrogen oxides present in the exhaust gas are converted substantially into elementary nitrogen and water through the use of a reducing agent (ammonia, urea, AdBlue) which is provided and through the use of the SCR coating of the radial honeycomb body. A 3-way coating is provided, in particular, for spark-ignition engines and performs an oxidation of carbon monoxide and hydrocarbon compounds and the reduction of nitrogen oxides. An $NO_x$ adsorber coating temporarily stores nitrogen oxides ($NO_x$) from exhaust gases of spark-ignition and diesel engines in such a way that nitrogen oxides are retained during lean-burn operation of the internal combustion engine, and the nitrogen oxides can then be reduced, and ultimately released from the coating, through the use of a brief period of operation with a rich exhaust-gas mixture.

In accordance with an additional feature of the configuration of the invention, the radial honeycomb body has flow channels disposed at an angle of 90° to 135° with respect to a central axis of the duct. That angle is formed, in particular, between the central axis of the duct and the orientation of the flow channels directly adjoining the inner peripheral surface of the radial honeycomb body. A sharp deflection of the exhaust-gas flow is thereby obtained, in such a way that the agglomerated particles in the exhaust-gas flow are for the very most part deposited in the particle separator which is disposed in the duct or downstream of the outlet of the duct.

In accordance with yet another feature of the configuration of the invention, an EGR line adjoins the particle separator. Such an EGR line (EGR: "Exhaust-Gas Recirculation") is generally constructed in such a way that only a relatively small proportion of the exhaust-gas flow of the internal combustion engine is supplied anew in order to further reduce nitrogen oxides or unburned hydrocarbon compounds contained in the exhaust gas. In this regard, the branching, which is proposed according to the invention, of a small part of the exhaust-gas flow should, in particular, be provided through the particle separator, wherein in this case the particle separator should be constructed in such a way that fluid can flow through it. The exhaust-gas flow which is thereby supplied to the EGR line and subsequently supplied anew to the internal combustion engine is therefore, in particular, substantially purified of particles contained in the exhaust gas.

In accordance with yet a further feature of the configuration of the invention, the particle separator has at least one regeneration device from the group including a heating wire, a heating catalytic converter, an injection device and a coating. Through the use of a regeneration device of the stated type, it is achieved that the particles which are present in the particle separator and which have been retained from the exhaust-gas flow are regenerated at regular intervals or else at intervals provided as a function of the loading of the particle separator, in such a way that a blockage of the particle separator as a result of the loading with particles from the exhaust-gas flow is prevented. The regeneration may take place either thermally or else as a continuous regeneration (CRT). In the case of the continuous regeneration, the soot which is present in the particle separator is converted to carbon dioxide through the use of a corresponding supply of nitrogen dioxide in the exhaust-gas flow.

In accordance with yet an added feature of the configuration of the invention, at least one heat exchanger is disposed at least around partial regions of the radial honeycomb body and/or of the particle separator. As a result of the integration of a heat exchanger into the configuration, a recovery of the heat energy of the exhaust gas is possible, for example through the use of a conversion of the thermal energy into electrical energy, which can then be supplied to the electric storage media of the motor vehicle or the electric consumers. For this purpose, the heat exchanger may, for example, be coupled to thermoelectric elements which may be provided outside and/or within the configuration.

In accordance with yet an additional feature of the invention, the heat exchanger includes one or more heating circuits, specifically a first heating circuit disposed outside the outer peripheral surface of the radial honeycomb body, a second heating circuit disposed at least partially within the radial honeycomb body, and/or a third heating circuit disposed outside the particle separator. In particular, the heating circuits disposed within the radial honeycomb body or outside the outer peripheral surface of the radial honeycomb body are therefore acted on over a large area by the exhaust-gas flow flowing through the radial honeycomb body, in such a way that a very high level of effectiveness of the heat exchanger can be attained. In this case, the heating circuit within the honeycomb body may run substantially in the longitudinal direction of the extent of the duct or of the radial honeycomb body through the structure of the honeycomb body, or may be disposed substantially perpendicular to the duct axis and between the flow channels of the radial honeycomb body. If appropriate, disk-shaped segments with thermoelectric elements may be disposed between the flow channels of the radial honeycomb body, in such a way that the conversion of the exhaust-gas heat energy into electrical energy takes place at least partially within the radial honeycomb body. This, too, makes a compact construction of the configuration possible.

In accordance with yet another feature of the configuration of the invention, at least one first oxidation catalytic converter is provided upstream of the one ionization device. The composition of the exhaust gas, for example with regard to the nitrogen dioxide, and/or the temperature of the exhaust gas, can advantageously be set through the use of the oxidation catalytic converter.

With the objects of the invention in view, there is also provided a method for purifying an exhaust-gas flow from an internal combustion engine. The method comprises:
  i) electrically charging particles contained in the exhaust-gas flow;
  ii) agglomerating the charged particles to form larger particles with increased mass inertia;
  iii) deflecting at least 80% by volume of the exhaust-gas flow through an angle of at least 90 degrees;
  iv) separating the larger particles having the increased mass inertia out of the exhaust-gas flow with the deflection of the exhaust-gas flow; and
  v) depositing the larger particles.

The method is, in particular, suitable for operating the configuration according to the invention.

Furthermore, through the use of the proposed method, at least 80% by volume, preferably at least 90% by volume and particularly preferably at least 95% by volume of the exhaust-gas flow is deflected through an angle of at least 90 degrees so as to flow through a radial honeycomb body provided for this purpose. In the case of a particle separator constructed in the form of a (flow) dead end, a 100% by volume deflection of the exhaust-gas flow takes place within the duct of the configuration according to the invention.

The non-deflected volume flow of the exhaust gas flows through a particle separator which is provided for this purpose and in which the at least partially agglomerated particles are at least partially retained. After flowing through the particle separator, the relatively small volume flow is preferably supplied to an EGR line or is merged again with the deflected exhaust-gas flow downstream of the configuration.

In one preferred embodiment of the method, it is additionally possible for heat energy to be recovered from the exhaust-gas flow. For this purpose, an at least partial conversion of thermal energy of the exhaust-gas flow into electrical energy is provided. Through the use of a heat exchanger of this type, it is possible in particular for the heat to also be dissipated from the relatively small part of the exhaust-gas flow which is supplied anew to the internal combustion engine through an EGR line.

With the objects of the invention in view, there is concomitantly provided a motor vehicle, comprising an exhaust system which has a configuration according to the invention.

Other features which are considered as characteristic for the invention are set forth in the appended claims, noting that the features specified individually in the dependent claims may be combined with one another in any desired technologically meaningful way and define further embodiments of the invention.

Although the invention is illustrated and described herein as embodied in a configuration and a method for cleaning an exhaust gas flow of an internal combustion engine by separating particles and a motor vehicle having the configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
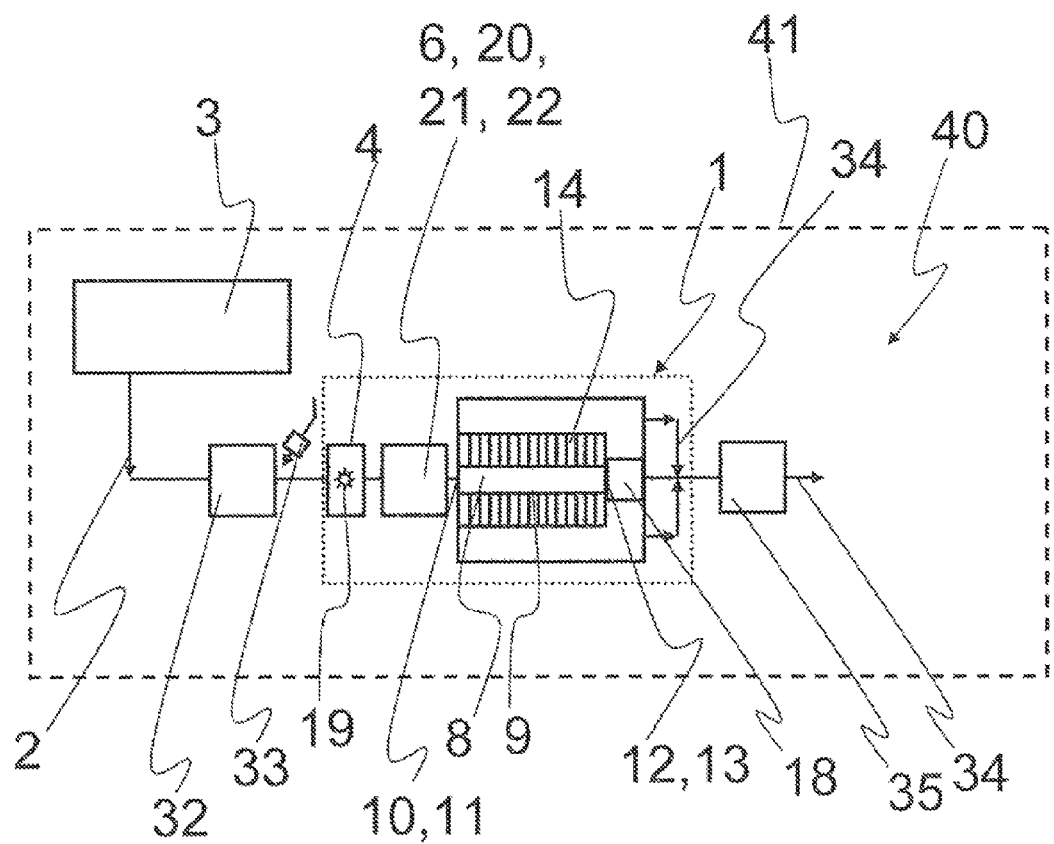
FIG. 1 is a diagrammatic, plan view of an exhaust system of an internal combustion engine having a configuration according to the invention.

Referring now in detail to the figures of the drawing, in which the same reference numerals are used for identical objects for explaining the invention and the technical field in more detail by showing particularly preferred structural variants to which the invention is not restricted, and first, particularly, to FIG. 1 thereof, there is seen a diagrammatic illustration of a motor vehicle 41 having an exhaust system 40, with a configuration 1 for the purification of an exhaust-gas flow 2 being provided downstream of an internal combustion engine 3. In this case, a first oxidation catalytic converter 32 is connected upstream of the configuration 1 in terms of flow. The first oxidation catalytic converter has a reducing agent adding unit 33, in particular downstream of its downstream end side, which preferably subjects the rear side of the first oxidation catalytic converter 32 to a reducing agent flow. The configuration 1 itself has an ionization device 4 with an apparatus 19 suitable for electrically charging particles of the exhaust-gas flow 2. The electrically charged particles are at least temporarily deposited in an agglomeration device 6 which is disposed downstream and which is formed by a pipe 20, a structure 21 or a honeycomb body 22. The particles which have been agglomerated in this way and which are now larger are returned to the exhaust-gas flow 2 as a result of the pulsation of the exhaust-gas flow 2 and/or through the use of an external excitation of the agglomeration device 6. The particles which have been agglomerated thereby enter into an inlet 10, which is disposed downstream, at a first end side 11 of a duct 8.

At least a major part of the exhaust-gas flow 2 is deflected, within the duct 8, into a radial honeycomb body 14. In this case, the radial honeycomb body 14 is disposed on a peripheral surface 9 of the duct 8. Furthermore, the duct 8 has an outlet 12 at a second end side 13 of the duct 8. At least some of the particles, in particular the relatively large particles, are passed through the outlet 12 into a particle separator 18. The exhaust-gas flow 2, after flowing through the radial honeycomb body 14 and/or, in particular, after flowing through the particle separator 18, is merged again through exhaust lines 34 into a common exhaust line 34, and is discharged to the environment, in particular, after flowing through a second oxidation catalytic converter 35. The second oxidation catalytic converter 35 is provided in this case, in particular, as a barrier catalytic converter for preventing the passage of reducing agent.

Figure 2:
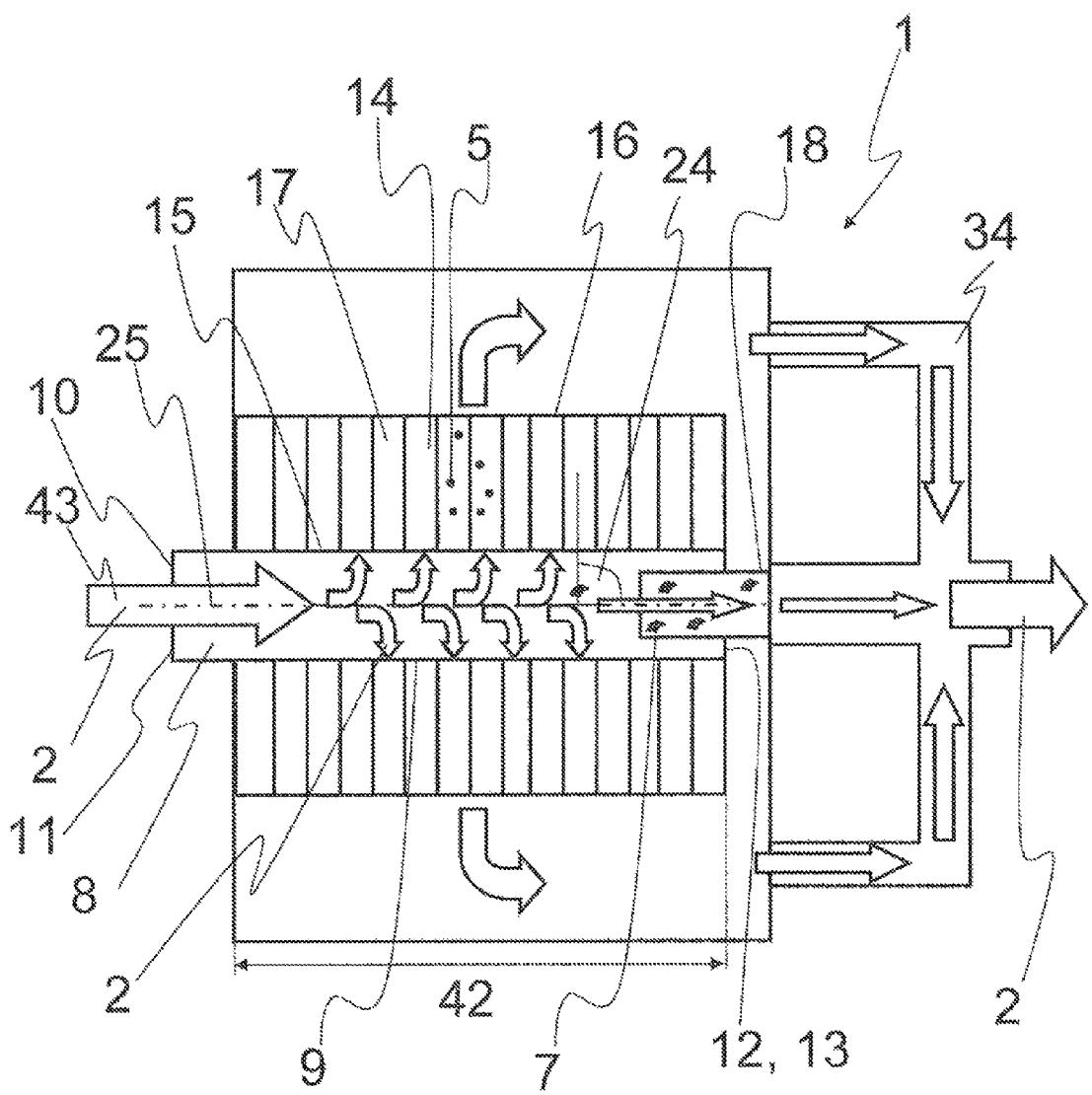
FIG. 2 is an enlarged plan view of a first embodiment of the configuration.

FIG. 2 shows a first embodiment of the configuration 1. The ionization device and the agglomeration device are not shown therein and may be disposed outside the duct 8 or within the duct 8. In the case of a placement within the duct 8, the latter is lengthened along a central axis 25 counter to the flow direction of the exhaust-gas flow 2, in such a way that the ionization device and the agglomeration device are disposed outside an extent 42 of the radial honeycomb body 14 and flow channels 17 of the radial honeycomb body 14 are freely accessible. The exhaust-gas flow 2 enters into the duct 8 through the inlet 10 which is disposed at the first end side 11 of the duct 8, flows into the duct 8 and is deflected at least for the most part through an angle 24 into the radial honeycomb body 14 as a result of the relatively high flow resistance of the particle separator 18 disposed in or downstream of the duct 8. In this case, the radial honeycomb body 14 has an inner peripheral surface 15 disposed on the peripheral surface 9 of the duct 8, in such a way that the exhaust-gas flow 2 at least for the most part flows radially outward through the flow channels 17 of the radial honeycomb body 14. That part of the exhaust-gas flow 2 then flows out through an outer peripheral surface 16 of the radial honeycomb body 14 and is conducted onward through the exhaust lines 34. An, in particular, small part of the exhaust-gas flow 2 flows through the duct 8 and is passed into the particle separator 18 which, in this case, is disposed in the duct 8 upstream of the outlet 12 of the duct 8 at the second end side 13 of the duct 8. In this case, the particle separator 18 is disposed at least partially within the extent 42 in a longitudinal direction 43 of the radial honeycomb body 14. In this case, the diameter of the particle separator 18 is constructed to be smaller than the diameter of the duct 8, in such a way that the exhaust-gas flow 2 can flow through all of the flow channels 17 of the radial honeycomb body 14.

The preferably only small part of the exhaust-gas flow 2 now has a major part of the particles 5 contained in the exhaust-gas flow 2, as a result of the deflection of the exhaust-gas flow 2 through the radial honeycomb body 14. Those particles have been agglomerated to form larger particles 7 as a result of having flowed through the ionization device and the agglomeration device. Those particles 7 are now deposited in the particle separator 18. That part of the exhaust-gas flow 2 which flows through the particle separator 18 is then merged with the exhaust-gas flow which has flowed through the radial honeycomb body 14, and conducted onward, through the common exhaust lines 34.

Figure 3:
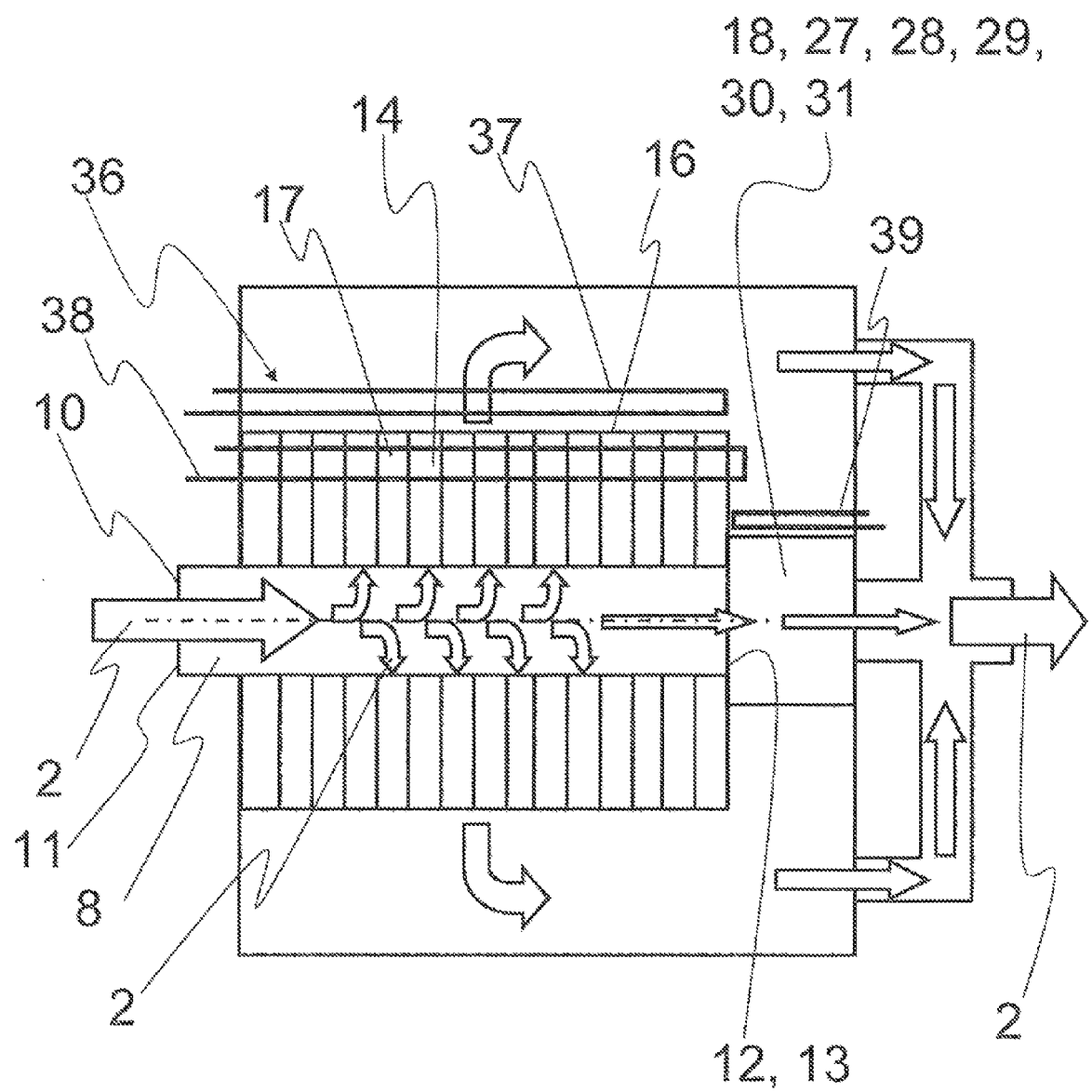
FIG. 3 is an enlarged plan view of a second embodiment of the configuration.

FIG. 3 shows a further embodiment of the configuration 1, in which the ionization device and the agglomeration device are also not shown, as in FIG. 2. The exhaust-gas flow 2 enters into the duct 8 through the inlet 10 which is disposed at the first end side 11 of the duct 8, and is deflected at least for the most part through the radial honeycomb body 14. In this case, at least one heat exchanger 36 is provided which has, in particular, a first heating circuit 37 that is disposed outside the outer peripheral surface 16 of the radial honeycomb body 14. Furthermore, a second heating circuit 38 is provided which, if appropriate, is connected to the first heating circuit 37 and which, in particular, is constructed to be independent thereof. The second heating circuit 38 may also be provided so as to be independent of the first heating circuit 37. The second heating circuit extends within the radial honeycomb body 14 and, in particular, is disposed perpendicular to the flow channels 17 of the radial honeycomb body 14.

An, in particular, small part of the exhaust-gas flow 2 flows through the entire duct 8 and is passed through the outlet 12 of the duct 8 into the particle separator 18 which is disposed downstream of the outlet 12 of the duct 8 at the second end side 13 of the duct 8.

In particular, a third heating circuit 39 is provided which can dissipate heat from the particle separator 18 which is generated, in particular, as a result of continuous regeneration or as a result of thermal regeneration within the particle separator 18.

In this case, the heating circuits 37, 38, 39 may have thermoelectric elements so as to permit a conversion of the thermal energy of the exhaust gas into electrical energy. The thermoelectric elements may be provided within or outside the configuration 1.

The particle separator 18 has at least one regeneration device 27 which may be a heating wire 28, a heating catalytic converter 29, an injector 30 or a coating 31.

Figure 4:
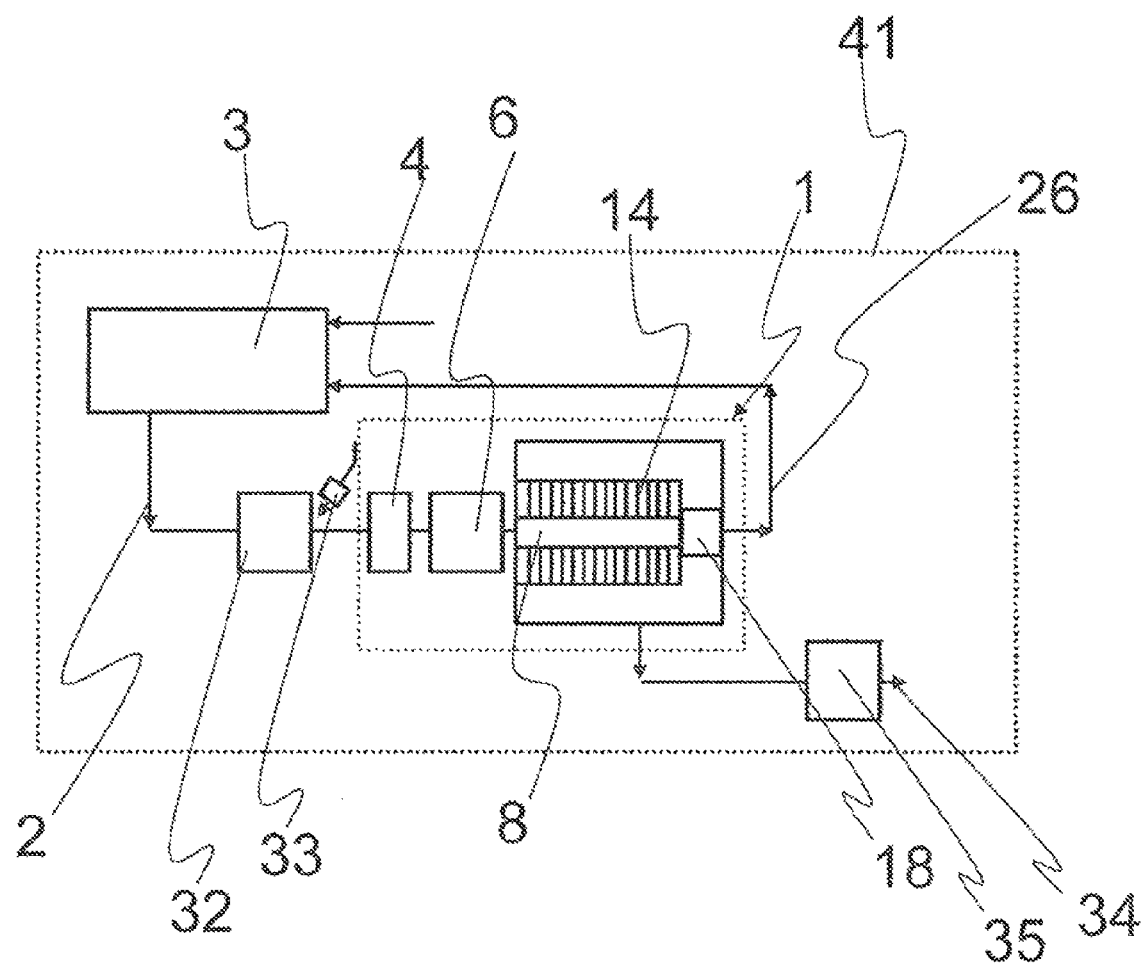
FIG. 4 is a view similar to FIG. 1 of a further embodiment of an exhaust system of an internal combustion engine.

FIG. 4 shows a further embodiment of the configuration 1, in which an internal combustion engine 3 of a motor vehicle 41 is provided and a part of an exhaust-gas flow 2 to the internal combustion engine is supplied through an EGR line 26. In this case, the exhaust-gas flow 2 of the internal combustion engine 3 flows through a first oxidation catalytic converter 32 which, in particular, is suitable for converting hydrocarbon compounds and carbon monoxide present in the exhaust-gas flow 2. A reducing agent adding unit 33 for adding a reducing agent into the exhaust-gas flow 2 is disposed, in particular, downstream of a rear side of the first oxidation catalytic converter. The reducing agent is preferably dispensed onto a downstream end side of the first oxidation catalytic converter 32. A substantial evaporation and good distribution of the reducing agent in the exhaust-gas flow 2, which is subsequently supplied to an ionization device 4 and an agglomeration device 6, is attained in this way. The exhaust-gas flow 2 is then passed into the duct 8 and conducted onward from there through the radial honeycomb body 14 or through the particle separator 18, with the particles having been for the most part removed from the exhaust-gas flow 2 by the particle separator 18. In this case, the exhaust-gas flow 2, which is discharged through the particle separator 18, is supplied anew to the internal combustion engine 3 through the EGR line 26. The exhaust-gas flow 2 which flows out through the radial honeycomb body 14 is supplied to an exhaust line 34 which, if appropriate, has a second oxidation catalytic converter 35 constructed in this case as a barrier catalytic converter, in such a way that the reducing agent is not discharged into the environment.

Accordingly, the invention relates, in particular, to a configuration for the purification of an exhaust-gas flow of a mobile internal combustion engine, which configuration has at least an ionization device, an agglomeration device and a (catalytically active) radial honeycomb body around a duct of the exhaust line, wherein the exhaust gas is deflected from the duct into the radial honeycomb body while the agglomerated particles are trapped in a particle separator of the duct.

The invention claimed is:
1. A configuration for purifying an exhaust-gas flow of an internal combustion engine, the configuration comprising:
  a) an ionization device for electrically charging particles in the exhaust-gas flow;
  b) an agglomeration device for at least partially agglomerating the electrically charged particles;
  c) a duct including at least a peripheral surface through which fluid can flow, a first end side with an inlet and a second end side with an outlet;
  d) a radial honeycomb body having an inner peripheral surface, an outer peripheral surface and flow channels extending from said inner peripheral surface to said outer peripheral surface, said inner peripheral surface being disposed on said peripheral surface of said duct; and
  e) a particle separator configured for at least temporarily retaining the particles from the exhaust-gas flow;
  said ionization device and said agglomeration device being disposed upstream of said inlet or in said duct and said particle separator being disposed downstream of said outlet or in said duct.

2. The configuration according to claim 1, wherein said ionization device has an apparatus for generating a corona discharge or plasma discharge.

3. The configuration according to claim 1, wherein said agglomeration device includes at least one element from the group consisting of a pipe, a structure and a honeycomb body.

4. The configuration according to claim 1, wherein said radial honeycomb body at least partially has at least one coating selected from the group consisting of an SCR coating, a 3-way coating and an $NO_x$ adsorber coating.

5. The configuration according to claim 1, wherein said duct has a central axis, and said flow channels of said radial honeycomb body are disposed at an angle of 90° to 135° relative to the central axis of said duct.

6. The configuration according to claim 1, which further comprises an exhaust-gas recirculation line adjoining said particle separator.

7. The configuration according to claim 1, wherein said particle separator has at least one regeneration device selected from the group consisting of a heating wire, a heating catalytic converter, an injector and a coating.

8. The configuration according to claim 1, which further comprises at least one heat exchanger disposed at least around partial regions of said radial honeycomb body and/or said particle separator.

9. The configuration according to claim 8, wherein said heat exchanger has a plurality of heating circuits including a first heating circuit disposed outside said outer peripheral surface of said radial honeycomb body, a second heating circuit disposed at least partially within said radial honeycomb body and a third heating circuit disposed outside said particle separator.

10. The configuration according to claim 1, which further comprises at least a first oxidation catalytic converter disposed upstream of said ionization device.

11. A method for purifying an exhaust-gas flow from an internal combustion engine, the method comprising the following steps:
   i) electrically charging particles contained in the exhaust-gas flow;
   ii) agglomerating the charged particles to form larger particles with increased mass inertia;
   iii) deflecting at least 80% by volume of the exhaust-gas flow through an angle of at least 90 degrees;
   iv) separating the larger particles having the increased mass inertia out of the exhaust-gas flow with the step of deflecting the exhaust-gas flow; and
   v) depositing the larger particles.

12. A motor vehicle, comprising:
   an exhaust system having a configuration according to claim 1.

* * * * *